US011992924B2

(12) United States Patent
Dittrich et al.

(10) Patent No.: US 11,992,924 B2
(45) Date of Patent: May 28, 2024

(54) SETTING TOOL

(71) Applicant: HILTI AKTIENGESELLSCHAFT, Schaan (LI)

(72) Inventors: Tilo Dittrich, Feldkirch (AT); Norbert Heeb, Buchs (CH)

(73) Assignee: HILTI AKTIENGESELLSCHAFT, Schaan (LI)

( * ) Notice: Subject to any disclaimer, the term of this patent is extended or adjusted under 35 U.S.C. 154(b) by 636 days.

(21) Appl. No.: 17/055,450

(22) PCT Filed: May 29, 2019

(86) PCT No.: PCT/EP2019/063963
§ 371 (c)(1),
(2) Date: Nov. 13, 2020

(87) PCT Pub. No.: WO2019/233852
PCT Pub. Date: Dec. 12, 2019

(65) Prior Publication Data

US 2021/0178561 A1 Jun. 17, 2021

(30) Foreign Application Priority Data

Jun. 6, 2018 (EP) .................................... 18176187

(51) Int. Cl.
*B25C 1/06* (2006.01)
*B25C 1/00* (2006.01)

(52) U.S. Cl.
CPC ................ *B25C 1/06* (2013.01); *B25C 1/003* (2013.01)

(58) Field of Classification Search
CPC .................................. B25C 1/06; B25C 1/003
See application file for complete search history.

(56) References Cited

U.S. PATENT DOCUMENTS 4,293,088 A * 10/1981 Barrett ...................... B25C 1/06 227/120
4,556,803 A 12/1985 Weigert
6,830,173 B2 * 12/2004 Barber ...................... B25C 1/06 173/217

(Continued)

FOREIGN PATENT DOCUMENTS

DE 2238440 A1 2/1974
DE 3436416 A1 8/1985
EP 1839815 A1 10/2007

OTHER PUBLICATIONS

International Bureau, International Search Report in International Application No. PCT/EP2019/063963, dated Jun. 26, 2019.

*Primary Examiner* — Thomas M Wittenschlaeger
*Assistant Examiner* — Katie L Gerth
(74) *Attorney, Agent, or Firm* — Leydig, Voit & Mayer, Ltd.

(57) ABSTRACT

A setting tool for driving fastening elements into a substrate is provided, the setting tool comprising a holder, which is provided for holding a fastening element, a drive-in element, which is provided for transferring a fastening element held in the holder into the substrate along a setting axis, a drive, which is provided for driving the drive-in element toward the fastening element along the setting axis, wherein the drive comprises an electrical capacitor, which is arranged on the setting axis or around the setting axis.

15 Claims, 2 Drawing Sheets

(56) References Cited

U.S. PATENT DOCUMENTS

| | | | | |
|---|---|---|---|---|
| 6,891,457 | B2 * | 5/2005 | Sako | B25C 5/15 335/254 |
| 8,104,659 | B2 | 1/2012 | St. John et al. | |
| 2013/0098963 | A1 * | 4/2013 | Gardner | B25C 5/15 227/110 |
| 2013/0334277 | A1 * | 12/2013 | Shima | B25C 1/06 318/114 |
| 2018/0036870 | A1 * | 2/2018 | Komazaki | B25C 1/06 |
| 2018/0133877 | A1 * | 5/2018 | Ueda | B25F 5/006 |

* cited by examiner

SETTING TOOL

The present invention relates to a setting tool for driving fastening elements into a substrate.

Such setting tools usually have a holder for a fastening element, from which a fastening element held therein is transferred into the substrate along a setting axis. For this, a drive-in element is driven toward the fastening element along the setting axis by a drive.

U.S. Pat. No. 6,830,173 B2 discloses a setting tool with a drive for a drive-in element. The drive has an electrical capacitor and a coil. For driving the drive-in element, the capacitor is discharged via the coil, whereby a Lorentz force acts on the drive-in element, so that the drive-in element is moved toward a nail.

The object of the present invention is to provide a setting tool of the aforementioned type with which high efficiency and/or good setting quality are ensured.

The object is achieved by a setting tool for driving fastening elements into a substrate, comprising a holder, which is provided for holding a fastening element, a drive-in element, which is provided for transferring a fastening element held in the holder into the substrate along a setting axis, a drive, which is provided for driving the drive-in element toward the fastening element along the setting axis, wherein the drive comprises an excitation coil which is flowed through by current and generates a magnetic field which accelerates the drive-in element onto the fastening element, and a stop element, which supports the drive-in element against movement toward the excitation coil when the drive-in element is in a ready-to-set position, the drive-in element being spaced apart from the excitation coil in the ready-to-set position. The setting tool can in this case preferably be used in a hand-held manner. Alternatively, the setting tool can be used in a stationary or semi-stationary manner.

In the context of the invention, a capacitor should be understood as meaning an electrical component that stores electrical charge and the associated energy in an electrical field. In particular, the capacitor has two electrically conducting electrodes, between which the electrical field builds up when the electrodes are electrically charged differently. In the context of the invention, a fastening element should be understood as meaning for example a nail, a pin, a clamp, a clip, a stud, in particular a threaded bolt, or the like.

A preferred embodiment is characterized in that an air gap is formed between the drive-in element and the excitation coil when the drive-in element is in a ready-to-set position. The air gap preferably has a gap width which is between 0 and 0.5 mm, particularly preferably between 0.01 mm and 0.2 mm, for example between 0.02 mm and 0.1 mm.

A preferred embodiment is characterized in that the stop element has a stop surface that faces the holder and the drive-in element has a counter surface that faces away from the holder, and the stop surface and the counter surface lie against one another when the drive-in element is in a ready-to-set position. The stop surface and/or the counter surface is preferably arranged on the setting axis or around the setting axis. Likewise preferably, the stop surface and/or the counter surface is convex, particularly preferably spherical.

A preferred embodiment is characterized in that a projection of the stop element in the direction of the setting axis is arranged radially inside a projection of the excitation coil in the direction of the setting axis. The stop element is preferably arranged radially inside the excitation coil with respect to the setting axis.

A preferred embodiment is characterized in that the drive comprises a soft-magnetic frame on which the excitation coil is arranged. The excitation coil is preferably embedded in the soft-magnetic frame. The drive-in element is preferably spaced apart from the soft-magnetic frame in the ready-to-set position. Particularly preferably, a further air gap is formed between the drive-in element and the soft-magnetic frame when the drive-in element is in the ready-to-set position.

A preferred embodiment is characterized in that the soft-magnetic frame is formed in a ring shape, wherein a projection of the stop element in the direction of the setting axis is arranged radially inside a projection of the soft-magnetic frame in the direction of the setting axis. The stop element is preferably arranged radially inside the soft-magnetic frame with respect to the setting axis.

A preferred embodiment is characterized in that the stop element and/or the drive-in element comprises a damper which has the stop surface or the counter surface. The damper preferably dampens striking of the drive-in element against the stop element.

A preferred embodiment is characterized in that the drive comprises an electrical capacitor, which is preferably arranged on the setting axis or around the setting axis, and, when the excitation coil is discharged, current flows through it in order to generate the magnetic field. A further embodiment is characterized in that the drive has arranged on the drive-in element a squirrel-cage rotor, which is permeated by the magnetic field generated by the excitation coil.

The invention is represented in a number of exemplary embodiments in the drawings, in which.

Figure 1:
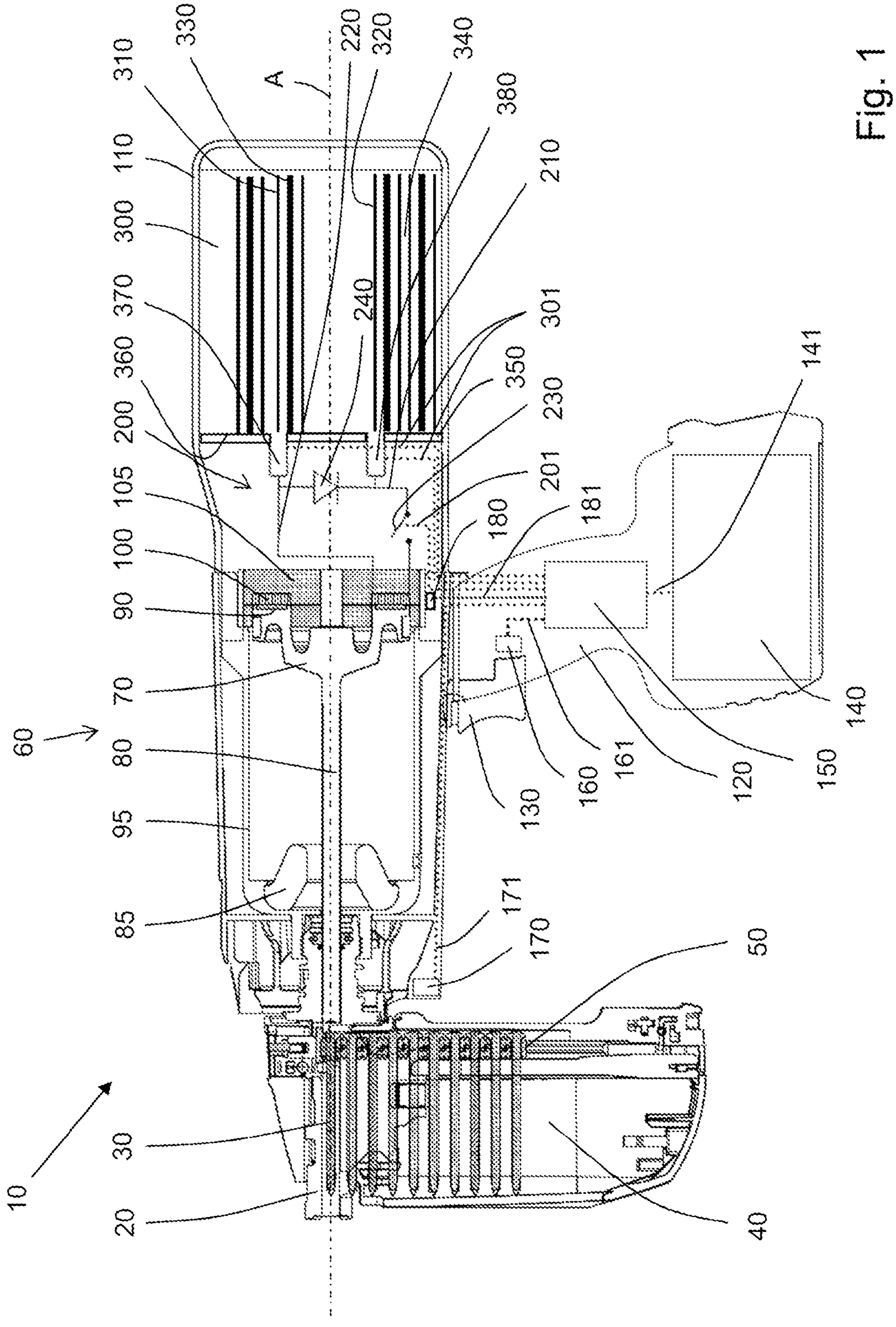
FIG. 1 shows a longitudinal section through a setting tool.

FIG. 1 illustrates a hand-held setting tool 10 for driving fastening elements into a substrate that is not shown. The setting tool 10 has a holder 20 formed as a stud guide, in which a fastening element 30, which is formed as a nail, is held in order to be driven into the substrate along a setting axis A (to the left in FIG. 1). For the purpose of supplying fastening elements to the holder, the setting tool 10 comprises a magazine 40 in which the fastening elements are held in store individually or in the form of a fastening element strip 50 and are transported to the holder 20 one by one. To this end, the magazine 40 has a spring-loaded feed element, not specifically denoted. The setting tool 10 has a drive-in element 60, which comprises a piston plate 70 and a piston rod 80. The drive-in element 60 is provided for transferring the fastening element 30 out of the holder 20 along the setting axis A into the substrate. In the process, the drive-in element 60 is guided with its piston plate 70 in a guide cylinder 95 along the setting axis A.

The drive-in element 60 is, for its part, driven by a drive, which comprises a squirrel-cage rotor 90 arranged on the piston plate 70, an excitation coil 100, a soft-magnetic frame 105, a switching circuit 200 and a capacitor 300 with an internal resistance of 5 mohms. The squirrel-cage rotor 90 consists of a preferably ring-like, particularly preferably circular ring-like, element with a low electrical resistance, for example made of copper, and is fastened, for example soldered, welded, adhesively bonded, clamped or connected in a form-fitting manner, to the piston plate 70 on the side of the piston plate 70 that faces away from the holder 20. In exemplary embodiments which are not shown, the piston plate itself is formed as a squirrel-cage rotor. The switching circuit 200 is provided for causing rapid electrical discharging of the previously charged capacitor 300 and conducting the thereby flowing discharge current through the excitation coil 100, which is embedded in the frame 105. The frame preferably has a saturation flux density of at least 1.0 T and/or an effective specific electrical conductivity of at most $10^6$ S/m, so that a magnetic field generated by the excitation coil 100 is intensified by the frame 105 and eddy currents in the frame 105 are suppressed.

In a ready-to-set position of the drive-in element 60 (FIG. 1), the drive-in element 60 enters with the piston plate 70 a ring-like recess, not specifically denoted, of the frame 105 such that the squirrel-cage rotor 90 is arranged at a small distance from the excitation coil 100. As a result, an excitation magnetic field, which is generated by a change in an electrical excitation current flowing through the excitation coil, passes through the squirrel-cage rotor 90 and, for its part, induces in the squirrel-cage rotor 90 a secondary electrical current, which circulates in a ring-like manner. This secondary current, which builds up and therefore changes, in turn generates a secondary magnetic field, which opposes the excitation magnetic field, as a result of which the squirrel-cage rotor 90 is subject to a Lorentz force, which is repelled by the excitation coil 100 and drives the drive-in element 60 toward the holder 20 and also the fastening element 30 held therein.

The setting tool 10 further comprises a housing 110, in which the drive is held, a handle 120 with an operating element 130 formed as a trigger, an electrical energy store 140 formed as a rechargeable battery, a control unit 150, a tripping switch 160, a contact-pressure switch 170, a a means for detecting a temperature of the excitation coil 100, formed as a temperature sensor 180 arranged on the frame 105, and electrical connecting lines 141, 161, 171, 181, 201, 301, which connect the control unit 150 to the electrical energy store 140, to the tripping switch 160, to the contact-pressure switch 170, to the temperature sensor 180, to the switching circuit 200 and, respectively, to the capacitor 300. In exemplary embodiments which are not shown, the setting tool 10 is supplied with electrical energy by means of a power cable instead of the electrical energy store 140 or in addition to the electrical energy store 140. The control unit comprises electronic components, preferably interconnected on a printed circuit board to form one or more electrical control circuits, in particular one or more microprocessors.

When the setting tool 10 is pressed against a substrate that is not shown (on the left in FIG. 1), a contact-pressure element, not specifically denoted, operates the contact-pressure switch 170, which as a result transmits a contact-pressure signal to the control unit 150 by means of the connecting line 171. This triggers the control unit 150 to initiate a capacitor charging process, in which electrical energy is conducted from the electrical energy store 140 to the control unit 150 by means of the connecting line 141 and from the control unit 150 to the capacitor 300 by means of the connecting lines 301, in order to charge the capacitor 300. To this end, the control unit 150 comprises a switching converter, not specifically denoted, which converts the electric current from the electrical energy store 140 into a suitable charge current for the capacitor 300. When the capacitor 300 is charged and the drive-in element 60 is in its ready-to-set position illustrated in FIG. 1, the setting tool 10 is in a ready-to-set state. Since charging of the capacitor 300 is only implemented by the setting tool 10 pressing against the substrate, to increase the safety of people in the area a setting process is only made possible when the setting tool 10 is pressed against the substrate. In exemplary embodiments which are not shown, the control unit already initiates the capacitor charging process when the setting tool is switched on or when the setting tool is lifted off the substrate or when a preceding driving-in process is completed.

When the operating element 130 is operated, for example by being pulled using the index finger of the hand which is holding the handle 120, with the setting tool 10 in the ready-to-set state, the operating element 130 operates the tripping switch 160, which as a result transmits a tripping signal to the control unit 150 by means of the connecting line 161. This triggers the control unit 150 to initiate a capacitor discharging process, in which electrical energy stored in the capacitor 300 is conducted from the capacitor 300 to the excitation coil 100 by means of the switching circuit 200 by way of the capacitor 300 being discharged.

To this end, the switching circuit 200 schematically illustrated in FIG. 1 comprises two discharge lines 210, 220, which connect the capacitor 300 to the excitation coil 200 and at least one discharge line 210 of which is interrupted by a normally open discharge switch 230. The switching circuit 200 forms an electrical oscillating circuit with the excitation coil 100 and the capacitor 300. Oscillation of this oscillating circuit back and forth and/or negative charging of the capacitor 300 may potentially have an adverse effect on the efficiency of the drive, but can be suppressed with the aid of a free-wheeling diode 240. The discharge lines 210, 220 are electrically connected, for example by soldering, welding, screwing, clamping or form-fitting connection, to in each case one electrode 310, 320 of the capacitor 300 by means of electrical contacts 370, 380 of the capacitor 300 which are arranged on an end side 360 of the capacitor 300 that faces the holder 20. The discharge switch 230 is preferably suitable for switching a discharge current with a high current intensity and is formed for example as a thyristor. In addition, the discharge lines 210, 220 are at a small distance from one another, so that a parasitic magnetic field induced by them is as low as possible. For example, the discharge lines 210, 220 are combined to form a busbar and are held together by a suitable means, for example a retaining device or a clamp. In exemplary embodiments which are not shown, the free-wheeling diode is connected electrically in parallel with the discharge switch. In further exemplary embodiments which are not shown, there is no free-wheeling diode provided in the circuit.

For the purpose of initiating the capacitor discharging process, the control unit 150 closes the discharge switch 230 by means of the connecting line 201, as a result of which a discharge current of the capacitor 300 with a high current intensity flows through the excitation coil 100. The rapidly rising discharge current induces an excitation magnetic field, which passes through the squirrel-cage rotor 90 and, for its part, induces in the squirrel-cage rotor 90 a secondary electrical current, which circulates in a ring-like manner. This secondary current which builds up in turn generates a secondary magnetic field, which opposes the excitation magnetic field, as a result of which the squirrel-cage rotor 90 is subject to a Lorentz force, which is repelled by the excitation coil 100 and drives the drive-in element 60 toward the holder 20 and also the fastening element 30 held therein. As soon as the piston rod 80 of the drive-in element 60 meets a head, not specifically denoted, of the fastening element 30, the fastening element 30 is driven into the substrate by the drive-in element 60. Excess kinetic energy of the drive-in element 60 is absorbed by a braking element 85 made of a spring-elastic and/or damping material, for example rubber, by way of the drive-in element 60 moving with the piston plate 70 against the braking element 85 and being braked by the latter until it comes to a standstill. The drive-in element 60 is then reset to the ready-to-set position by a resetting tool that is not specifically denoted.

The capacitor 300, in particular its center of gravity, is arranged behind the drive-in element 60 on the setting axis A, whereas the holder 20 is arranged in front of the drive-in element 60. Therefore, with respect to the setting axis A, the capacitor 300 is arranged in an axially offset manner in relation to the drive-in element 60 and in a radially overlapping manner with the drive-in element 60. As a result, on the one hand a small length of the discharge lines 210, 220 can be realized, as a result of which their resistances can be reduced, and therefore an efficiency of the drive can be increased. On the other hand, a small distance between a center of gravity of the setting tool 10 and the setting axis A can be realized. As a result, tilting moments in the event of recoil of the setting tool 10 during a driving-in process are small. In an exemplary embodiment which is not shown, the capacitor is arranged around the drive-in element.

The electrodes 310, 320 are arranged on opposite sides of a carrier film 330 which is wound around a winding axis, for example by metallization of the carrier film 330, in particular by being vapor-deposited, wherein the winding axis coincides with the setting axis A. In exemplary embodiments which are not shown, the carrier film with the electrodes is wound around the winding axis such that a passage along the winding axis remains. In particular, in this case the capacitor is for example arranged around the setting axis. The carrier film 330 has at a charging voltage of the capacitor 300 of 1500 V a film thickness of between 2.5 μm and 4.8 μm and at a charging voltage of the capacitor 300 of 3000 V a film thickness of for example 9.6 μm. In exemplary embodiments which are not shown, the carrier film is for its part made up of two or more individual films which are arranged as layers one on top of the other. The electrodes 310, 320 have a sheet resistance of 50 ohms/□.

A surface of the capacitor 300 has the form of a cylinder, in particular a circular cylinder, the cylinder axis of which coincides with the setting axis A. A height of this cylinder in the direction of the winding axis is substantially the same size as its diameter, measured perpendicularly to the winding axis. On account of a small ratio of height to diameter of the cylinder, a low internal resistance for a relatively high capacitance of the capacitor 300 and, not least, a compact construction of the setting tool 10 are achieved. A low internal resistance of the capacitor 300 is also achieved by a large line cross section of the electrodes 310, 320, in particular by a high layer thickness of the electrodes 310, 320, wherein the effects of the layer thickness on a self-healing effect and/or on a service life of the capacitor 300 should be taken into consideration.

The capacitor 300 is mounted on the rest of the setting tool 10 in a manner damped by means of a damping element 350. The damping element 350 damps movements of the capacitor 300 relative to the rest of the setting tool 10 along the setting axis A. The damping element 350 is arranged on the end side 360 of the capacitor 300 and completely covers the end side 360. As a result, the individual windings of the carrier film 330 are subject to uniform loading by recoil of the setting tool 10. In this case, the electrical contacts 370, 380 protrude from the end surface 360 and pass through the damping element 350. For this purpose, the damping element 350 in each case has a clearance through which the electrical contacts 370, 380 protrude. The connecting lines 301 respectively have a strain-relief and/or expansion loop, not illustrated in any detail, for compensating for relative movements between the capacitor 300 and the rest of the setting tool 10. In exemplary embodiments which are not shown, a further damping element is arranged on the capacitor, for example on the end side of the capacitor that faces away from the holder. The capacitor is then preferably clamped between two damping elements, that is to say the damping elements bear against the capacitor with pretension. In further exemplary embodiments which are not shown, the connecting lines have a rigidity which continuously decreases as the distance from the capacitor increases.

Figure 2:
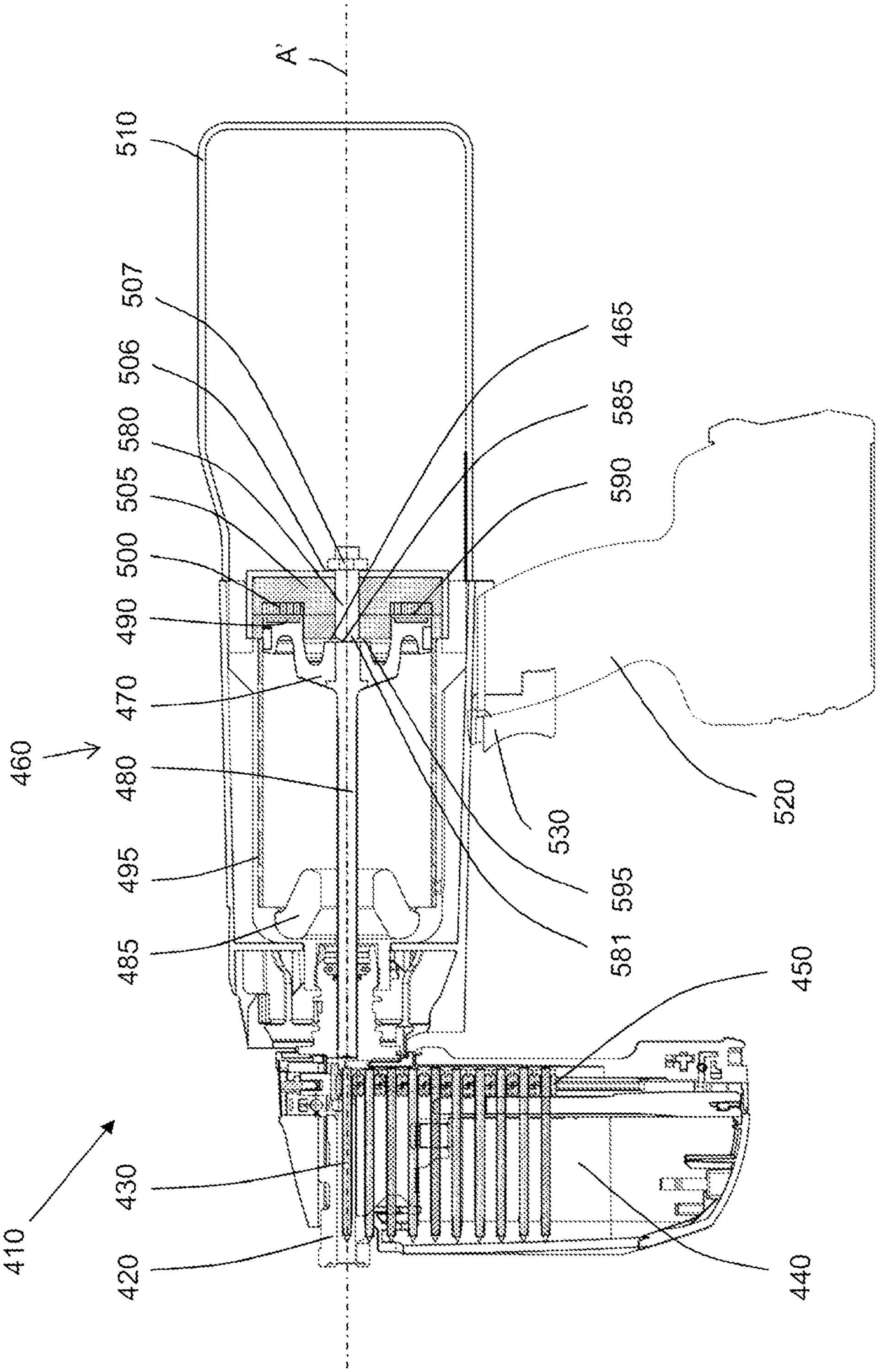
FIG. 2 shows a longitudinal section through a setting tool.

FIG. 2 illustrates a further exemplary embodiment of a hand-held setting tool 410 for driving fastening elements along a setting axis A' into a substrate that is not shown. Analogously to the setting tool 10 illustrated in FIG. 1, the setting tool 410 comprises a holder 420 formed as a stud guide, in which a fastening element 430, which is formed as a nail, is held, a magazine 440, in which the fastening elements are held in store individually or in the form of a fastening element strip 450, a drive-in element 460, which comprises a piston plate 470 and a piston rod 480, a guide cylinder 495, in which the piston plate 470 is guided, a braking element 485 and a stop element 580.

The drive-in element 460 is driven by a drive, which comprises a squirrel-cage rotor 490 arranged on the piston plate 470, an excitation coil 500, a ring-like soft-magnetic frame 505, a switching circuit that is not shown and a capacitor that is likewise not shown. The setting tool 410 further comprises a housing 510, in which the drive is held, a handle 520 with an operating element 530 formed as a trigger and further components that are not shown, such as an electrical energy store or a power cable, a control unit, a tripping switch, a contact-pressure switch and electrical connecting lines, which connect the control unit to the electrical energy store, to the tripping switch, to the contact-pressure switch, to the switching circuit and, respectively, to the capacitor, and a resetting device.

In the ready-to-set position of the drive-in element 460 illustrated in FIG. 2, the stop element 580 supports the drive-in element 460 against movement toward the excitation coil 500. In this case, the drive-in element 460 is spaced apart from the excitation coil 500 to form an air gap 590 with a gap width of 0.05 mm and from the soft-magnetic frame 505 to form a further air gap 595 with a gap width of for example 0.5 mm. This has the effect of preventing or mitigating impact of the drive-in element 460 on the excitation coil 500, which may be additionally dampened with the aid of an air cushion between the drive-in element 460 and the excitation coil 500. With the aid of the stop element 580, a small gap width, and thus a large repulsive force, between the excitation coil 500 and the squirrel-cage rotor 490 is ensured. The stop element 580 has facing the holder 420 a convex stop surface 585, which is arranged on the setting axis A'. The drive-in element 460 has facing away from the holder 420 a flat counter surface 465, which is likewise arranged on the setting axis A'. In exemplary embodiments which are not shown, instead of or in addition to the stop surface, the counter surface is convex, in particular spherical. In the ready-to-set position of the drive-in element 460 illustrated in FIG. 2, the stop surface 585 and the counter surface 465 lie against one another. With respect to the setting axis A', the stop element 580 is arranged radially inside the excitation coil 500 and radially inside the soft-magnetic frame 505. The stop element 580 comprises a damper 581, which has the stop surface 585 and dampens striking of the drive-in element 460 against the stop element 580.

The setting tool 410 functions substantially in just the same way as the setting tool 10 illustrated in FIG. 1. When the drive-in element 60 is returned to the ready-to-set position by the resetting device, the counter surface 465 comes to lie against or strikes the stop surface 585. A mechanical stressing of the excitation coil 500 and/or the soft-magnetic frame 505 is reduced due to the respective distance of the excitation coil 500 or the soft-magnetic frame from the drive-in element 460.

The piston rod 480 preferably passes through the piston plate 470 and has the counter surface 465. The piston rod 480 is made of an impact-resistant material, such as for example steel, with the effect of reducing wear of the piston rod 480 when the fastening elements 430 are repeatedly hit and/or likewise when the stop element 580 is repeatedly hit. The piston plate 470 is protected from impact by the arrangement according to the invention and consists of a low-density material, for example aluminum, so that a total mass of the drive-in element 460, and thus energy required to accelerate it, is reduced. The stop element 580 is preferably rod-shaped and preferably consists of an impact-resistant material, such as for example steel, and is supported, in particular fastened, on the housing 510 directly or indirectly, for example by means of a reinforcement 506 of the soft-magnetic frame 505 and/or a fastening element 507, for example a screw or nut.

The invention has been described using a series of exemplary embodiments that are illustrated in the drawings and exemplary embodiments that are not illustrated. The individual features of the various exemplary embodiments are applicable individually or in any desired combination with one another, provided that they are not contradictory. It should be noted that the setting tool according to the invention can also be used for other applications.

The invention claimed is:

1. A setting tool for driving fastening elements into a substrate, comprising a holder for holding a fastening element; a drive-in element for transferring a fastening element held in the holder into the substrate along a setting axis; a drive for driving the drive-in element toward the fastening element along the setting axis, wherein the drive comprises an excitation coil, wherein current flows through the excitation coil and generates a magnetic field which accelerates the drive-in element onto the fastening element; and, a stop element, which supports the drive-in element against movement toward the excitation coil when the drive-in element is in a ready-to-set position, the drive-in element being spaced apart from the excitation coil in the ready-to-set position, wherein a projection of the stop element in a direction of the setting axis is arranged radially inside a projection of the excitation coil in the direction of the setting axis.

2. The setting tool as claimed in claim 1, wherein the stop element is arranged radially inside the excitation coil with respect to the setting axis.

3. A setting tool for driving fastening elements into a substrate, comprising a holder for holding a fastening element a drive-in element for transferring a fastening element held in the holder into the substrate along a setting axis; a drive for driving the drive-in element toward the fastening element along the setting axis, wherein the drive comprises an excitation coil and a soft-magnetic frame on which the excitation coil is arranged, wherein the soft-magnetic frame is formed in a ring shape, and wherein a projection of the stop element in a direction of the setting axis is arranged radially inside a projection of the soft-magnetic frame in the direction of the setting axis, wherein current flows through the excitation coil and generates a magnetic field that creates a Lorentz force which repels the drive-in element from the excitation coil onto the fastening element; and, a stop element, which supports the drive-in element against movement toward the excitation coil when the drive-in element is in a ready-to-set position, the drive-in element being spaced apart from the excitation coil in the ready-to-set position.

4. The setting tool as claimed in claim 3, wherein the drive-in element is spaced apart from the soft-magnetic frame in the ready-to-set position.

5. The setting tool as claimed in claim 3, wherein a further air gap is formed between the drive-in element and the soft-magnetic frame when the drive-in element is in the ready-to-set position.

6. The setting tool as claimed in claim 3, wherein the stop element is arranged radially inside the soft-magnetic frame with respect to the setting axis.

7. A setting tool for driving fastening elements into a substrate, comprising a holder for holding a fastening element; a drive-in element for transferring a fastening element held in the holder into the substrate along a setting axis; a drive for driving the drive-in element toward the fastening element along the setting axis, wherein the drive comprises an excitation coil, wherein current flows through the excitation coil and generates a magnetic field which accelerates the drive-in element onto the fastening element; and, a stop element, which supports the drive-in element against movement toward the excitation coil when the drive-in element is in a ready-to-set position, the drive-in element being spaced apart from the excitation coil in the ready-to-set position, wherein the stop element and/or the drive-in element comprises a damper which has a stop surface or a counter surface, wherein the damper dampens striking of the drive-in element against the stop element.

8. A setting tool for driving fastening elements into a substrate, comprising a holder for holding a fastening element a drive-in element for transferring a fastening element held in the holder into the substrate along a setting axis; a drive for driving the drive-in element toward the fastening element along the setting axis, wherein the drive comprises an excitation coil, wherein current flows through the excitation coil and generates a magnetic field that creates a Lorentz force which repels the drive-in element from the excitation coil onto the fastening element and, a stop element, which supports the drive-in element against movement toward the excitation coil when the drive-in element is in a ready-to-set position, the drive-in element being spaced apart from the excitation coil in the ready-to-set position, wherein the stop element has a stop surface that faces the holder and the drive-in element has a counter surface that faces away from the holder, and wherein the stop surface and the counter surface lie against one another when the drive-in element is in the ready-to-set position, wherein the stop surface and/or the counter surface is convex, and wherein the stop surface and/or the counter surface is spherical.

9. The setting tool as claimed in claim 8, wherein an air gap is formed between the drive-in element and the excitation coil when the drive-in element is in the ready-to-set position.

10. The setting tool as claimed in claim 9, wherein the air gap has a gap width which is between 0 and 0.5 mm.

11. The setting tool of claim 10, wherein the gap width is between 0.01 mm and 0.2 mm.

12. The setting tool of claim 11, wherein the gap width is between 0.02 mm and 0.1 mm.

13. The setting tool as claimed in claim 8, wherein the stop surface and/or the counter surface is arranged on the setting axis or around the setting axis.

14. The setting tool as claimed in claim 13, wherein the stop surface and/or the counter surface is convex.

15. The setting tool of claim 8, comprising a hand-held setting tool.

* * * * *